April 1, 1958 L. R. JACOBSEN 2,829,211
NARROW BAND AMPLIFIERS OR THE LIKE
Filed Oct. 29, 1954
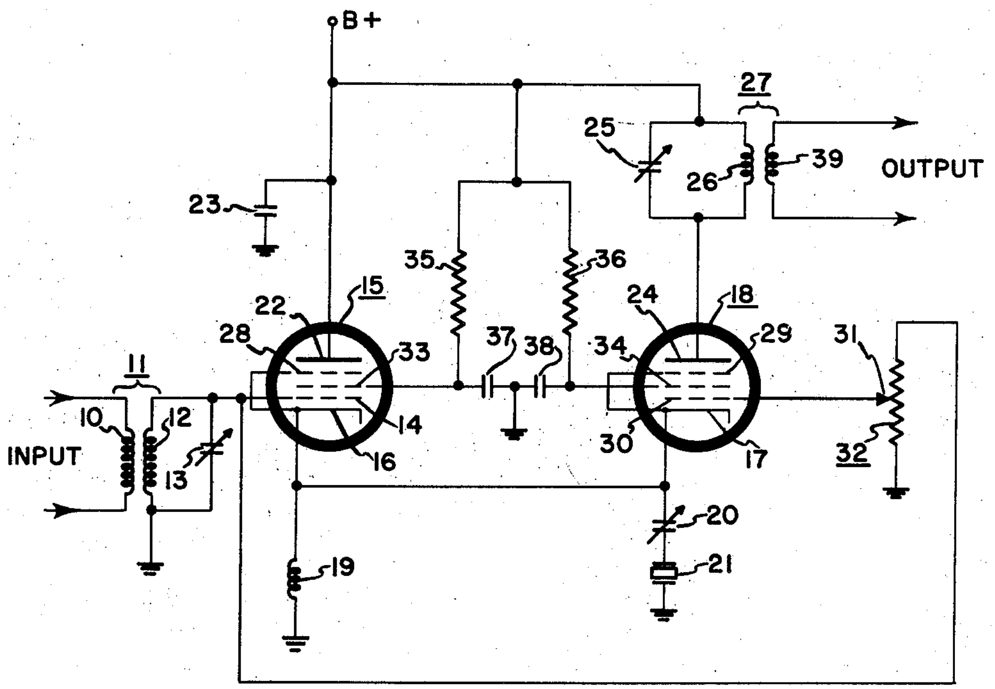
LANCE R. JACOBSEN
*INVENTOR.*
BY [signature]
HIS ATTORNEY United States Patent Office 2,829,211

Patented Apr. 1, 1958

2,829,211

NARROW BAND AMPLIFIERS OR THE LIKE

Lance R. Jacobsen, Lynwood, Calif., assignor to Hoffman Electronics Corporation, a corporation of California Application October 29, 1954, Serial No. 465,583

1 Claim. (Cl. 179—171)

This invention is related to narrow band amplifiers, and more particularly, to an improved narrow band amplifier which is highly selective and yet inexpensive to manufacture.

In the past, there has arisen the need for amplifiers which are highly selective as to frequency. This is particularly true in the telephone communications art. Telephone transmitting systems transmit the side band channels together with a carrier of reduced amplitude. The sole purpose of the carrier transmission is to supply sufficient carrier signal to actuate the AFC system of the receiver. It is at once apparent that there exists a need for a sharply selective circuit which will select the reduced carrier and amplify the same for AFC purposes. Telephone receiving systems presently employ various types of filter networks which have proven quite costly to manufacture.

Therefore, it is an object of this invention to provide an improved circuit for detecting and amplifying a single frequency from a relatively wide band of frequencies, and which at the same time will be inexpensive to manufacture.

It is a further object of this invention to provide a new and useful narrow band amplifier which will be highly reliable and maintain sharp selectivity.

According to the present invention, two amplifiers have a common cathode circuit consisting of a high impedance shunted by a crystal having a relatively low impedance at its series resonance frequency. The control electrodes of both amplifiers are directly coupled together so that signals whose frequencies differ from the crystal frequency will not appear in the output circuit of the second amplifier since, by virtue of the high cathode impedance, the signal voltages appearing at both cathodes will be in phase with the signal voltages appearing at their respective control electrodes; whereas the signal whose frequency equals the frequency of the crystal will bypass the high cathode impedance by virtue of the crystal operating at series resonance so that the cathode and control electrodes of the second amplifier will be out of phase 180°, thus enabling this frequency signal to appear in the output circuit of the second amplifier.

The features of the present invention which are believed to be novel are set forth with particularity in the appended claim. The present invention, both as to its organization and manner of operation, together with further objects and advantages thereof, may best be understood by reference to the following description, taken in connection with the accompanying drawing, in which:

The sole figure is a schematic diagram of a narrow band amplifier according to the present invention.

In the sole figure, a composite input signal is coupled from primary winding 10 of transformer 11 to secondary winding 12. Secondary winding 12 is shunted by variable capacitor 13. Secondary winding 12 and variable capacitor 13 form a parallel resonant circuit which is coupled between ground and control electrode 14 of vacuum tube

15. Cathodes 16 and 17 of vacuum tubes 15 and 18, respectively, are jointly coupled through high impedance 19 (preferably an inductor but might comprise a resistor) and also through variable capacitor 20 in series with crystal 21 to ground. Anode 22 of vacuum tube 15 is coupled to a source of positive voltage (B+), and also to ground through R. F. bypass capacitor 23. Anode 24 of vacuum tube 18 is coupled to a source of positive voltage (B+) through a parallel resonant circuit consisting of variable capacitor 25 shunted by primary winding 26 of transformer 27. Suppressor electrodes 28 and 29 are directly connected to cathodes 16 and 17, respectively. Control electrode 30 of vacuum tube 18 is coupled through tap 31 of potentiometer 32 to control electrode 14 of vacuum tube 15. Screen electrodes 33 and 34 are coupled through screen dropping resistors 35 and 36, respectively, to a source of positive voltage (B+), and also to ground through R. F. bypass capacitors 37 and 38, respectively. The output signal from the anode circuit of vacuum tube 18 is coupled from primary winding 26 of transformer 27 to secondary winding 39, which in turn is coupled to the circuit (not shown) which is to be driven by the selected carrier signal.

The circuit shown in the sole figure operates as follows. The composite input signal consisting of carrier and modulation components is coupled through transformer 11, and the parallel resonant circuit associated therewith, to control electrode 14 of vacuum tube 15. Anode 22 of vacuum tube 15 is placed at R. F. ground potential by virtue of bypass capacitor 23, so that the entire carrier and side bands will appear across common cathode load impedance 19, which is shunted by the series circuit consisting of variable capacitor 20 and crystal 21. For signals whose frequencies differ from the series resonant frequency of crystal 21, the signal voltages appearing at control electrodes 14 and 30 will be in phase with the signal voltages appearing at cathodes 16 and 17. Consequently, by the appropriate adjustment of tap 31 of potentiometer 32, side band signals will not appear in the output of transformer 27. However, a signal whose frequency is the equivalent of the series resonant frequency of crystal 21 will, in effect, be shorted across high impedance 19, by virtue of crystal 21 being in series resonance, and accordingly cathode 17 and control electrode 30 will be out of phase 180°. This out of phase voltage relationship will be additive and, consequently, this signal frequency will appear as an output signal from transformer 27. From a theoretical point of view, variable capacitor 20 is not strictly necessary. However, from a practical standpoint, variable capacitor 20 may be employed to tune, slightly, crystal 21, as it is known in the art that series tuning capacitors are capable of adjusting crystal resonance.

Crystal 21 may be chosen to have an extremely narrow pass band so that, even if the frequency of operation is in the megacycle range, the selectivity of the subject amplifier will exhibit a pass band only a very few cycles wide. Modulation components which are removed even 5 or 6 cycles from the carrier frequency have been shown experimentally to be entirely removed from the output of the second amplifier.

It is accordingly seen that the present invention supplies a new and useful narrow band amplifier which is highly selective, and which obviates the necessity of employing costly filter networks in the circuitry therein. And, as may be seen by reference to the sole figure, the circuitry of the subject invention may be manufactured simply and such manufacture will be very inexpensive.

While particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

I claim:

A narrow band amplifier for amplifying substantially a single frequency of a composite input signal including, in combination, first and second vacuum tubes each having anode, cathode, and control electrodes, an input circuit coupled between said control electrode of said first vacuum tube and a common reference potential for applying said composite input signal to said first vacuum tube, coupling means between said control electrode of said first vacuum tube and said control electrode of said second vacuum tube for applying said composite input signal to said second vacuum tube, a common load impedance having a first terminal coupled to said cathode electrodes of said first and second vacuum tubes and a second terminal maintained at said common reference potential, a crystal coupled in a shunting relationship to said common load impedance, said anode of said first vacuum tube being coupled to a voltage source which is positive with respect to said common reference potential, said common load impedance being non-resonant at all frequencies occurring in said composite signal and having high impedance at all such frequencies, and said crystal having substantially zero impedance at its resonant frequency whereby said second vacuum tube will amplify only those signals having the frequency of said crystal and will be degeneratively biased against translation of all other frequencies of operation, and an output circuit resonant at said single frequency and including a direct current circuit path connected between said anode electrode of said second vacuum tube and said positive voltage source.

References Cited in the file of this patent

UNITED STATES PATENTS

| | | |
|---|---|---|
| 2,064,990 | Roberts | Dec. 22, 1936 |
| 2,269,001 | Blumlein | Jan. 6, 1942 |
| 2,276,565 | Crosby | Mar. 17, 1942 |
| 2,280,605 | Roberts | Apr. 21, 1942 |
| 2,312,194 | Roder | Feb. 23, 1943 |
| 2,589,240 | Frye | Mar. 18, 1952 |

FOREIGN PATENTS

| | | |
|---|---|---|
| 836,659 | Germany | Apr. 15, 1952 |